United States Patent
Manoukian et al.

(10) Patent No.: US 10,232,951 B2
(45) Date of Patent: Mar. 19, 2019

(54) SYSTEM AND METHOD FOR SELECTING AN OPENING ANGLE OF AN AUXILIARY POWER UNIT INLET DOOR

(71) Applicant: PRATT & WHITNEY CANADA CORP., Longueuil (CA)

(72) Inventors: Patrick Manoukian, Saint-Laurent (CA); Sarah Theriault, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/440,507

(22) Filed: Feb. 23, 2017

(65) Prior Publication Data

US 2018/0237152 A1  Aug. 23, 2018

Related U.S. Application Data (60) Provisional application No. 62/461,057, filed on Feb. 20, 2017.

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B64D 41/00* | (2006.01) |
| *F01D 17/24* | (2006.01) |
| *F02C 9/00* | (2006.01) |
| *B64C 1/14* | (2006.01) |
| *B64D 33/02* | (2006.01) |

(52) U.S. Cl.
CPC ............. *B64D 41/00* (2013.01); *F01D 17/24* (2013.01); *B64D 2033/0213* (2013.01); *F05D 2220/50* (2013.01); *F05D 2270/306* (2013.01)

(58) Field of Classification Search
CPC ......... B64D 41/00; F01D 17/24; F02C 7/268; F02C 7/04; B64C 1/14
USPC .......................... 701/49; 60/794; 244/129.5
See application file for complete search history.

(56) References Cited

U.S. PATENT DOCUMENTS

| | | |
|---|---|---|
| 6,272,838 B1 | 8/2001 | Harvell et al. |
| 6,349,899 B1 | 2/2002 | Ralston |
| 6,901,737 B2 | 6/2005 | Schnoor |
| 7,364,116 B2 | 4/2008 | Nguyen et al. |
| 7,469,545 B2 | 12/2008 | Riley |
| 7,540,142 B2 | 6/2009 | Sheoran et al. |

(Continued)

*Primary Examiner* — Mahmoud S Ismail
(74) *Attorney, Agent, or Firm* — Norton Rose Fulbright Canada LLP (57) ABSTRACT

There is provided a method and a system for controlling an inlet door of an auxiliary power unit provided on an aircraft. Input data indicative of whether the aircraft is on ground or airborne is received. If the aircraft is on ground, a first control signal comprising instructions to command the inlet door to a fully open position is output. If the aircraft is airborne, a second control signal comprising instructions to command the inlet door to a partially open position. When a current value of a rotational speed of the auxiliary power unit reaches a predetermined threshold indicative of an end of a start sequence of the auxiliary power unit, a third control signal comprising instructions to transition the inlet door from the partially open position to the fully open position is output.

15 Claims, 5 Drawing Sheets

(56) References Cited

U.S. PATENT DOCUMENTS

| | | | |
|---|---|---|---|
| 8,079,550 B2 | 12/2011 | Brill et al. | |
| 8,141,816 B2 | 3/2012 | Robbins et al. | |
| 8,439,061 B2 | 5/2013 | Baumann | |
| 8,967,530 B2 | 3/2015 | Gatzke | |
| 2009/0272847 A1* | 11/2009 | Robbins | B64D 33/02 244/129.5 |
| 2013/0074519 A1 | 3/2013 | Ertz et al. | |
| 2016/0090915 A1* | 3/2016 | Wolff | B64D 41/00 60/794 |

* cited by examiner

FIGURE 5

SYSTEM AND METHOD FOR SELECTING AN OPENING ANGLE OF AN AUXILIARY POWER UNIT INLET DOOR

CROSS-REFERENCE TO RELATED APPLICATIONS

This patent application claims priority under 35 USC § 119(e) of U.S. provisional Application Ser. No. 62/461,057, filed on Feb. 20, 2017, the contents of which are hereby incorporated by reference.

TECHNICAL FIELD

The application relates generally to auxiliary power units and, more particularly, to controlling an opening angle of an auxiliary power unit inlet door.

BACKGROUND OF THE ART

An auxiliary power unit (APU) may be provided with an inlet door that is moveable between a closed position and one or more open positions to allow airflow into the APU and accordingly provide the desired APU functionalities.

In some existing systems, the APU inlet door is typically commanded fully open when the aircraft is on the ground and commanded partially open at all times when the aircraft is in flight. This approach is however not optimal for high altitude load applications. There is therefore a need for an improved system and method for controlling an auxiliary power unit inlet door.

SUMMARY

In one aspect, there is provided a method for controlling an inlet door of an auxiliary power unit provided on an aircraft. The method comprises receiving input data indicative of whether the aircraft is on ground or airborne, if the aircraft is on ground, outputting a first control signal comprising instructions to command the inlet door to a fully open position, and, if the aircraft is airborne, outputting a second control signal comprising instructions to command the inlet door to a partially open position and then outputting a third control signal comprising instructions to transition the inlet door from the partially open position to the fully open position when a current value of a rotational speed of the auxiliary power unit reaches a predetermined threshold indicative of an end of a start sequence of the auxiliary power unit.

In another aspect, there is provided a system for controlling an inlet door of an auxiliary power unit provided on an aircraft. The system comprises a memory and a processing unit coupled to the memory and configured to receive input data indicative of whether the aircraft is on ground or airborne, if the aircraft is on ground, output a first control signal comprising instructions to command the inlet door to a fully open position, and, if the aircraft is airborne, output a second control signal comprising instructions to command the inlet door to a partially open position and then output a third control signal comprising instructions to transition the inlet door from the partially open position to the fully open position when a current value of a rotational speed of the auxiliary power unit reaches a predetermined threshold indicative of an end of a start sequence of the auxiliary power unit.

In a further aspect, there is provided a computer readable medium having stored thereon program code executable by a processor for receiving input data indicative of whether the aircraft is on ground or airborne, if the aircraft is on ground, outputting a first control signal comprising instructions to command an inlet door of an auxiliary power unit provided on an aircraft to a fully open position, and, if the aircraft is airborne, outputting a second control signal comprising instructions to command the inlet door to a partially open position and then outputting a third control signal comprising instructions to transition the inlet door from the partially open position to the fully open position when a current value of a rotational speed of the auxiliary power unit reaches a predetermined threshold indicative of an end of a start sequence of the auxiliary power unit.

DESCRIPTION OF THE DRAWINGS

Reference is now made to the accompanying figures in which.

DETAILED DESCRIPTION

Figure 1:
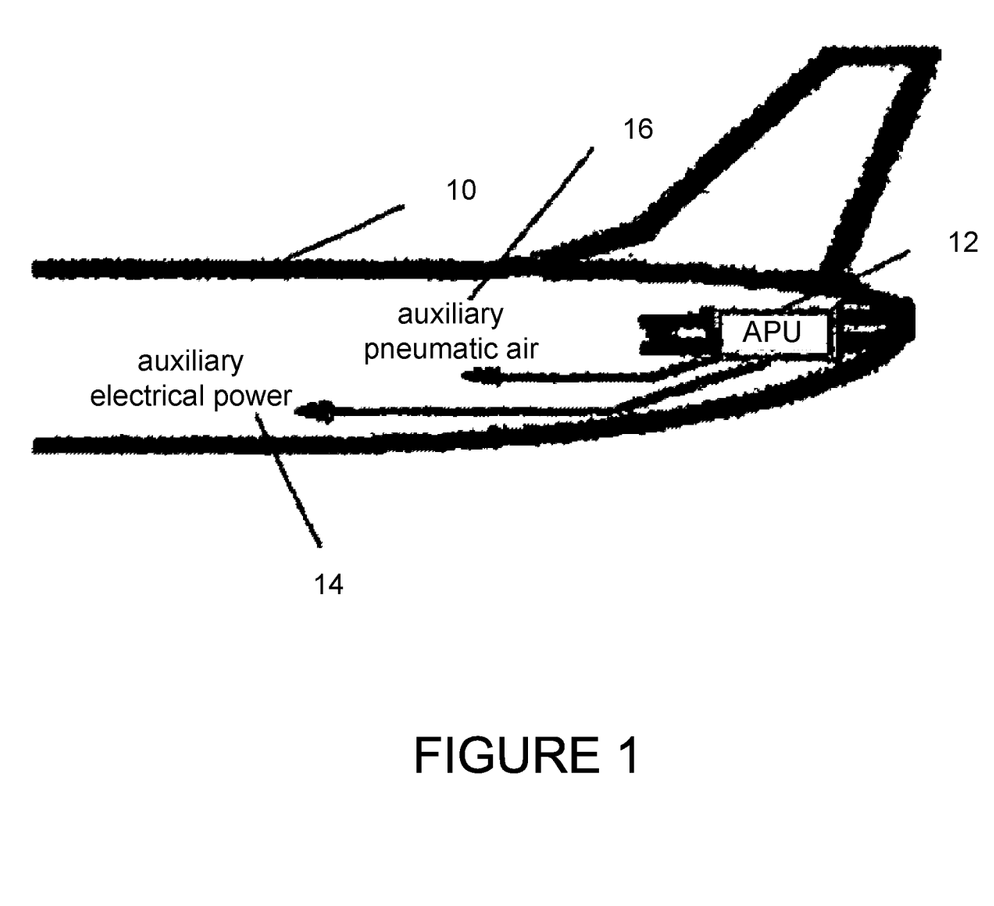
FIG. 1 is a schematic representation of an aircraft including an APU, in accordance with an illustrative embodiment.

Referring to FIG. 1, in one embodiment, an aircraft 10 has mounted thereon an APU 12, which is provided for conventional purposes, including, but not limited to, the provision of electrical power 14 and pneumatic air 16 to the aircraft 10. Among other well-known uses, pneumatic air 16 provided by the APU 12 is used on larger aircraft to provide auxiliary bleed air for starting the aircraft's main engines (not shown).

Figure 2:
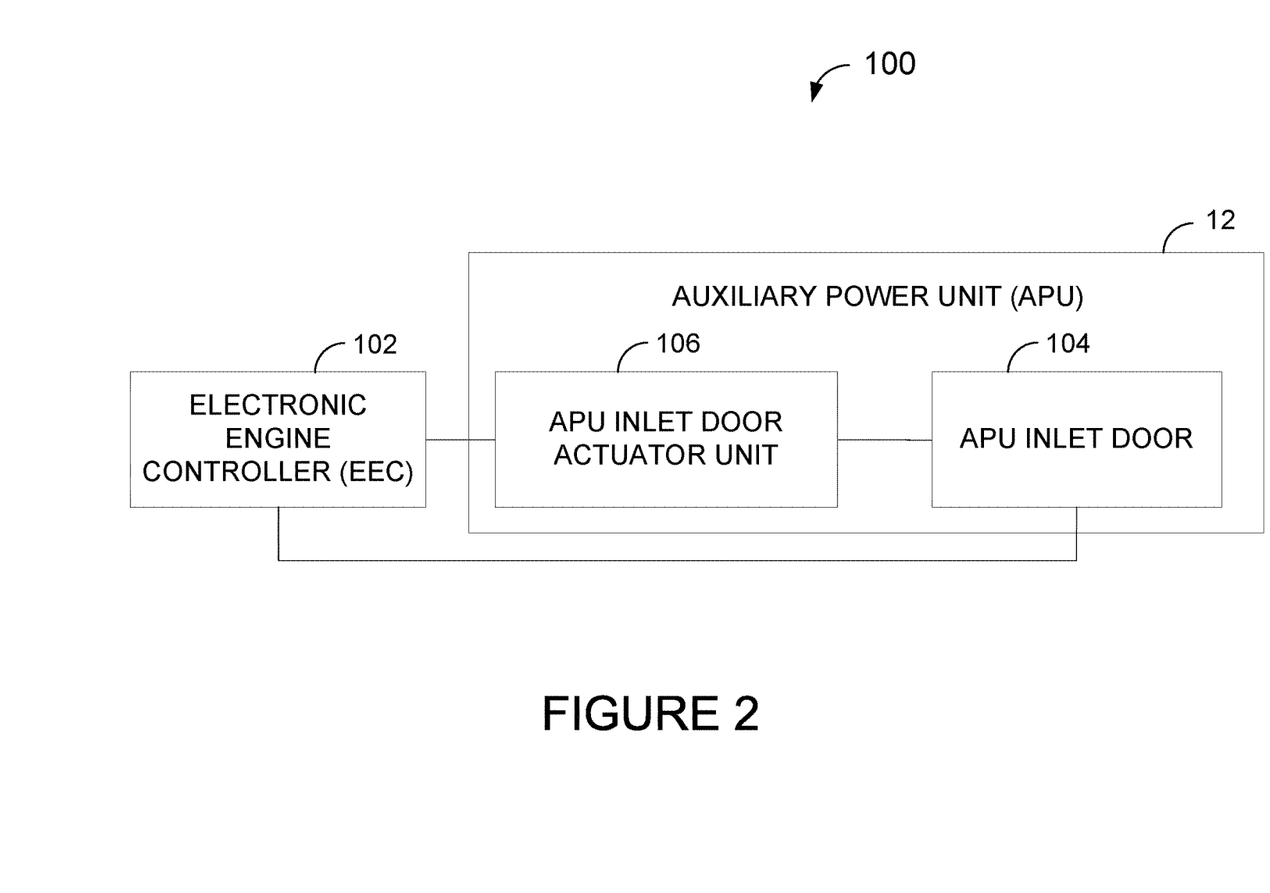
FIG. 2 is a block diagram of a system for controlling an inlet door of the APU of FIG. 1, in accordance with an illustrative embodiment.

FIG. 2 illustrates an example system 100 for controlling (and more particularly selecting an opening angle of) an inlet door of a gas turbine engine, such as the APU 12 of FIG. 1. The system 100 comprises an Electronic Engine Controller (EEC) 102, which controls the APU 12, and more particularly the APU inlet door 104. The EEC 102 sends position commands (e.g. in the form of one or more control signal(s)) to an APU inlet door actuator unit 106, which in turn causes the APU inlet door 104 to be moved to one or more commanded positions. In particular, the APU inlet door 104 is moved between a closed position and one or more open positions in which air is allowed to flow into the APU to provide desired APU functionality. It is desirable for the APU inlet door 104 to be open while the APU is running but closed when the APU is not operating so as to reduce drag to the aircraft in flight and prevent foreign object ingestion while on ground. After sending the position commands, the EEC 102 also receives from the APU inlet door 104 and/or the APU inlet door actuator unit 106 feedback of the inlet door's position, thereby allowing the EEC 102 to monitor the position of the APU inlet door 104 in real-time.

In one embodiment, the APU inlet door 104 has two predetermined open positions, namely a "Partially Open" position and a "Fully Open" position, with the opening angle of the APU inlet door 104 in the "Fully Open" position being greater than the opening angle of the APU inlet door 104 in the "Partially Open" position. In one embodiment, the opening angle of the "Fully Open" position is thirty-five (35) degrees and the opening angle of the "Partially Open" position is thirty (30) degrees. It should however be understood that other suitable opening angles may apply. In addition, it should be understood that a suitable open position is selected depending on flight conditions. The APU inlet door 104 may be moved to the "Fully Open" position when the aircraft is on the ground while the door may be transitioned between the "Partially Open" and the "Fully Open" positions when the aircraft is in flight.

In particular and as will be discussed further herein, during normal operation, the EEC 102 selects the inlet door opening angle based on the aircraft's airborne status and causes the door position to be transitioned towards the end of the APU start sequence in order to allow for immediate load application when the APU reaches 100% of operational speed (e.g. regardless of the aircraft's airborne status). The ability of the APU 12 to start may be degraded by the increased ram effect brought on by a fully open inlet door in flight. In addition, when subjected to high ram, the APU 12 is more sensitive to distortion and at risk for stall. For these reasons, the EEC 102 typically commands the APU inlet door 104 to the "Partially Open" position during the APU start sequence, while the aircraft is in the airborne condition. However, when the APU 12 is loaded with either electrical or pneumatic loads, the APU 12 requires a maximum amount of inlet air for optimal performance, which is achieved when the APU inlet door 104 is fully open. The APU 12 can be loaded as soon as the EEC 102 sends a "Ready To Load" (RTL) signal to the aircraft, the RTL signal being sent when the APU speed reaches 100%.

To make sure that the APU inlet door 104 is in the right position to accept load as soon as the APU 12 reaches its full operating speed (i.e. 100% speed), it is proposed to command the change of inlet door opening angle towards the end of the APU start sequence. As will be discussed further below, in a preferred embodiment, the change of opening angle is commanded by the EEC 102 when the engine reaches a predetermined threshold of 85% speed, i.e. in anticipation of reaching APU 100% speed. The APU is therefore started in flight and accelerated with the inlet door in the "Partially Open" position and transitioned to the "Fully Open" position towards the end of the APU start sequence. In this manner, power delivery can be maximized while preventing the APU from failing to complete the start sequence.

Figure 3:
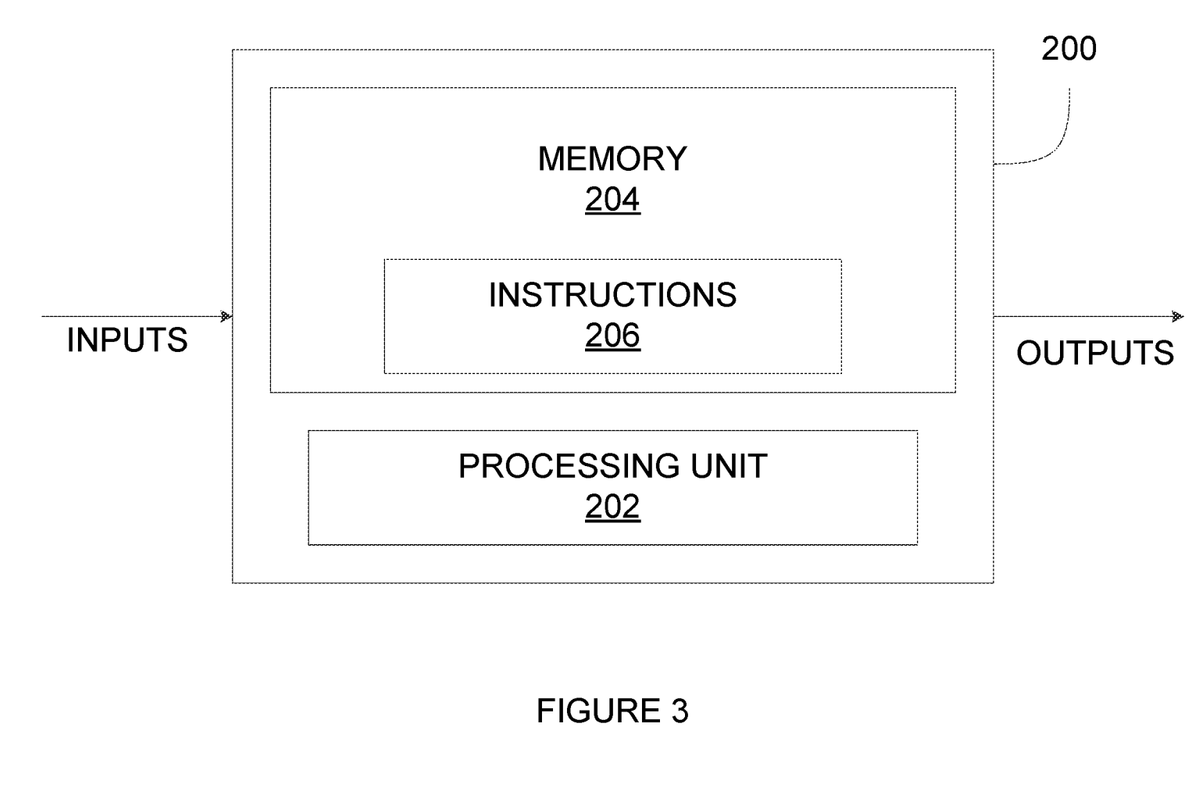
FIG. 3 is a block diagram of a computing device for implementing the electronic engine controller of FIG. 2, in accordance with an illustrative embodiment.

FIG. 3 is an example embodiment of a computing device 200 for implementing the EEC 102 described above with reference to FIG. 2. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps specified in the method described herein to be executed. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 4:
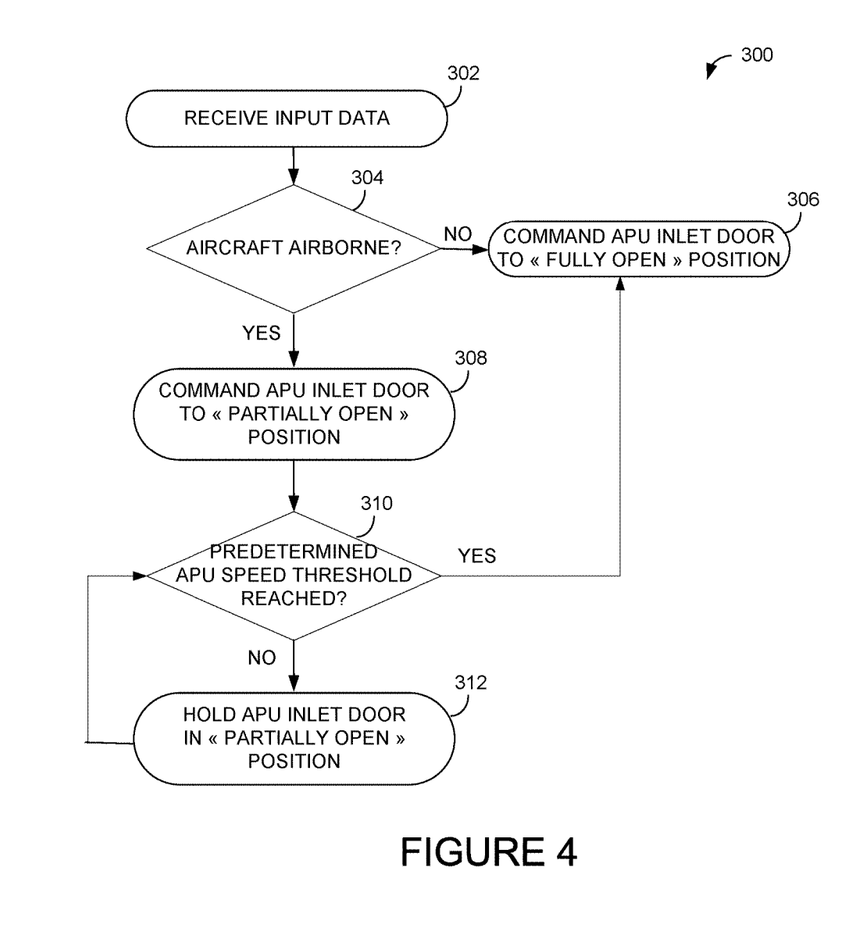
FIG. 4 is a flowchart of a method for controlling an inlet door of the APU of FIG. 1, in accordance with an illustrative embodiment.

Referring now to FIG. 4, an example method 300 for controlling (and more particularly selecting an opening angle of) an inlet door of a gas turbine engine in accordance with a first embodiment will now be described. The method 300 may be implemented by the computing device 200 of FIG. 3. The method 300 comprises the step 302 of receiving input data 302 (e.g. from the aircraft), which is processed in subsequent steps of the method 300. In particular, at step 304, the method 300 processes the input data to assess whether the aircraft is airborne or on ground. This may comprise analyzing input data such as an air/ground signal (e.g. a "Weight On Wheels" (WOW) signal), which is indicative of whether the aircraft has weight on its wheels. It should however be understood that other suitable input data may be received and analyzed to determine whether the aircraft is airborne.

If it is determined at step 304 that the aircraft is not airborne, the next step 306 is to command the APU inlet door to the "Fully Open" position, since no ram effect adversely impacts the ability to start the APU on ground. Otherwise, if the aircraft is airborne, the next step 308 is to command the APU inlet door to the "Partially Open" position. The method 300 then further processes the received input data (e.g. a measurement of the rotational speed of the APU) to assess whether the APU speed has reached a predetermined speed threshold (step 310). If it is determined at step 310 that the predetermined APU speed threshold has been reached, meaning that the end of the APU start sequence is approaching, the method 300 flows to the step 306 of commanding the APU inlet door to the "Fully Open" position. Otherwise, if the predetermined APU speed threshold has not been reaches, the APU inlet door is held in the "Partially Open" position at step 312. The method 300 then flows back to the step 310 of comparing the current value of the APU speed to the speed threshold.

The speed threshold is illustratively computed as per equation (1) below:

$$st = s - (a * t) \qquad (1)$$

where st is the predetermined speed threshold in %, s is the APU operating speed in normal steady state (e.g. 100%), a is the APU acceleration rate in % per second, and t is the time (in seconds) required to move the APU inlet door from the "Partially Open" position to the "Fully Open" position. In one embodiment, the value of the speed threshold is set to 85% and is indicative of an end of the start sequence of the APU. It should however be understood that, depending on the APU acceleration rate, a speed threshold of 80% or 90% may apply. In a preferred embodiment, the speed threshold is therefore substantially 85%.

The value of the speed threshold at which the APU inlet door is commanded "Fully Open" is illustratively selected to minimize both the time during which the APU inlet door is in the "Partially Open" position and the APU is operating at RTL and the time during which the APU inlet door is in the "Fully Open" position and the APU is starting. In particular and as discussed herein, it is desirable to select the value of the speed threshold such that the APU inlet door is opened as late as possible during (i.e. towards an end of) the APU start sequence and to ensure that the APU inlet door is in the "Fully Open" position when the APU reaches 100% speed. On the one hand, transitioning the APU inlet door to the "Fully Open" position before the APU speed reaches the threshold (e.g. 85% speed) would increase the airflow to the compressor of the APU and would impact the ability of the APU to complete the start sequence. This could in turn slow down the APU's acceleration and require more time to achieve the RTL state. On the other hand, transitioning the door to the "Fully Open" position after the APU speed has reached the threshold (e.g. 85% speed) could lead to the APU inlet door not being fully open once the APU speed reaches full operating speed. This could in turn lead to a temporarily degraded APU operation.

Figure 5:
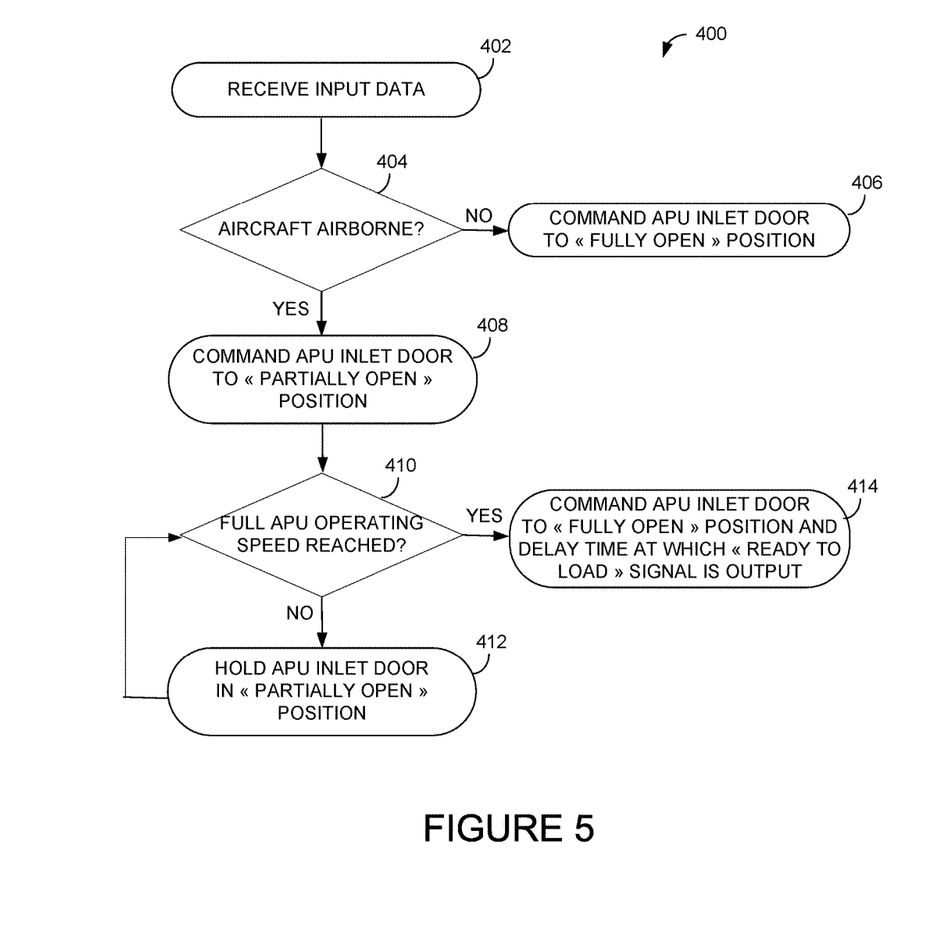
FIG. 5 is a flowchart of a method for controlling an inlet door of the APU of FIG. 1, in accordance with another illustrative embodiment.

FIG. 5 illustrates another example method 400 for controlling (and more particularly selecting an opening angle of) an inlet door of a gas turbine engine in accordance with a second embodiment. The method 400 may be implemented by the computing device 200 of FIG. 3. Similarly to the method 300 of FIG. 4, after input data is received at step 402, it is determined (step 404) whether the aircraft is airborne. If the aircraft is on the ground, the method 400 commands the APU inlet door to the "Fully Open" position (step 406). If the aircraft is airborne, the APU inlet door is commanded to the "Partially Open" position (step 408) and the next step 410 is to determine whether the APU has reached its full operating speed (i.e. whether the APU speed equals 100%). If this is not the case, the APU inlet door is held in the "Partially Open" position (step 412) and the method 400 flows back to step 410. Otherwise, if the APU speed has reached its full operating speed, the next step 414 is to command the APU inlet door to the "Fully Open" position. In order to prevent degraded operation and improve transient response right after load application, step 414 further comprises delaying the time at which the RTL signal is output, thereby ensuring that load is applied to the APU once the APU inlet door is in the "Fully Open" position.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for controlling an inlet door of an auxiliary power unit provided on an aircraft, the method comprising:
receiving input data indicative of whether the aircraft is on ground or airborne; and
responsive to determining that the aircraft is airborne, outputting a first control signal comprising instructions to command the inlet door to a partially open position and then outputting a second control signal comprising instructions to transition the inlet door from the partially open position to a position with a greater opening angle than that associated with the partially open position when a current value of a rotational speed of the auxiliary power unit reaches a predetermined threshold indicative of an end of a start sequence of the auxiliary power unit, the predetermined threshold greater than 50% of a maximum speed of the auxiliary power unit.

2. The method of claim 1, further comprising computing the predetermined threshold based on a steady state rotational speed of the auxiliary power unit, an acceleration rate of the auxiliary power unit, and a travel time of the inlet door.

3. The method of claim 1, wherein the current value of the rotational speed of the auxiliary power unit is compared to 85% speed.

4. The method of claim 1, wherein the current value of the rotational speed of the auxiliary power unit is compared to a full rotational speed of the auxiliary power unit.

5. The method of claim 4, further comprising, when the current value of the rotational speed of the auxiliary power unit corresponds to the full rotational speed, outputting a third control signal comprising instructions to delay application of load to the auxiliary power unit.

6. The method of claim 1, wherein the second control signal is output as comprising instructions to transition the inlet door from the partially open position to a fully open position.

7. A system for controlling an inlet door of an auxiliary power unit provided on an aircraft, the system comprising:
a memory; and
a processing unit coupled to the memory and configured to:
receive input data indicative of whether the aircraft is on ground or airborne; and
responsive to determining that the aircraft is airborne, output a first control signal comprising instructions to command the inlet door to a partially open position and then output a second control signal comprising instructions to transition the inlet door from the partially open position to a position with a greater opening angle than that associated with the partially open position when a current value of a rotational speed of the auxiliary power unit reaches a predetermined threshold indicative of an end of a start sequence of the auxiliary power unit, the predetermined threshold greater than 50% of a maximum speed of the auxiliary power unit.

8. The system of claim 7, wherein the processing unit is configured to compute the predetermined threshold based on a steady state rotational speed of the auxiliary power unit, an acceleration rate of the auxiliary power unit, and a travel time of the inlet door.

9. The system of claim 7, wherein the processing unit is configured to compare the current value of the rotational speed of the auxiliary power unit to 85% speed.

10. The system of claim 7, wherein the processing unit is configured to compare the current value of the rotational speed of the auxiliary power unit to a full rotational speed of the auxiliary power unit.

11. The system of claim 10, wherein the processing unit is configured to, when the current value of the rotational speed of the auxiliary power unit corresponds to the full rotational speed, output a third control signal comprising instructions to delay application of load to the auxiliary power unit.

12. The system of claim 7, wherein the processing unit is configured to output the second control signal as comprising instructions to transition the inlet door from the partially open position to a fully open position.

13. A non-transitory computer readable medium having stored thereon program code executable by a processor for:

receiving input data indicative of whether the aircraft is on ground or airborne; and responsive to determining that the aircraft is airborne, outputting a first control signal comprising instructions to command the inlet door to a partially open position and then outputting a second control signal comprising instructions to transition the inlet door from the partially open position to a position with a greater opening angle than that associated with the partially open position when a current value of a rotational speed of the auxiliary power unit reaches a predetermined threshold indicative of an end of a start sequence of the auxiliary power unit, the predetermined threshold greater than 50% of a maximum speed of the auxiliary power unit.

14. The method of claim 1, further comprising, responsive to determining that the aircraft is on ground, outputting a third control signal comprising instructions to command the inlet door to a fully open position.

15. The system of claim 7, wherein the processing unit is configured to, responsive to determining that the aircraft is on ground, output a third control signal comprising instructions to command the inlet door to a fully open position.

\* \* \* \* \*